US006884169B2

(12) United States Patent
Tsuchida et al.

(10) Patent No.: US 6,884,169 B2
(45) Date of Patent: Apr. 26, 2005

(54) TURN BASED VIDEO GAME THAT DISPLAYS CHARACTER BATTLE SEQUENCE

(75) Inventors: Toshiro Tsuchida, Tokyo (JP); Takatsugu Nakazawa, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 304 days.

(21) Appl. No.: 09/964,801

(22) Filed: Sep. 28, 2001

(65) Prior Publication Data

US 2002/0142833 A1 Oct. 3, 2002

(30) Foreign Application Priority Data

Mar. 29, 2001 (JP) ........................................ 2001-097738

(51) Int. Cl.[7] .............................................. A63F 13/00
(52) U.S. Cl. ............................................ 463/31; 463/8
(58) Field of Search ........................ 463/1, 7–8, 30–34, 463/43–44

(56) References Cited

U.S. PATENT DOCUMENTS

| 4,738,451 A | * | 4/1988 | Logg .............................. 463/2 |
| 5,390,937 A | * | 2/1995 | Sakaguchi et al. .............. 463/7 |
| 6,347,994 B1 | * | 2/2002 | Yoshikawa et al. ............. 463/7 |
| 6,540,606 B1 | * | 4/2003 | Matsukata ...................... 463/1 |

FOREIGN PATENT DOCUMENTS

| JP | 11267361 | 10/1999 |
| JP | 2000279637 | 10/2000 |
| JP | 2001157780 | 6/2001 |

OTHER PUBLICATIONS

Perrin et al.: Runequest, circa 1978, Chaosium Inc. pp. 15–16.*
Peterson et al.: Champions: The Super Hero Role Playing Game, circa 1981, Hero Games, pp. 50–52.*
Werewolf: The Apocalypse: Feburary 2001, White Wolf, http://white–wolf.com.*
Vampire: The Masquerafe: circa 1997, White Wolf, http://www.white–wolf.com.*
Gauntlet, circa 1987, Mindscape Inc., see entire document.*
Wizard's Crown, circa 1995: Strategic Simulations Inc., pp. 17–22.*
Age of Rifles, circa 1996: Strategic Simulations Inc, see entire document.*

(Continued)

Primary Examiner—Michael O'Neill
(74) Attorney, Agent, or Firm—Greenblum & Bernstein, P.L.C.

(57) ABSTRACT

Players can quickly and easily determine the sequence of play following the player character in the current turn, and can flexibly use the characteristics applied to each of multiple characters to strategically advance the game. When a battle scene is detected, information preset according to the actions that the player characters are to perform, information preset according to the characteristics assigned individually to multiple characters, and information preset according to the status derived from game progress for each of the multiple characters is used in a calculation to determine the action sequence of the multiple characters. The determined action sequence is displayed according to the selection of actions each player character is to perform. If the player then performs a specific operation, the selected actions and the action sequence of the multiple characters corresponding to those actions are accepted.

31 Claims, 7 Drawing Sheets

OTHER PUBLICATIONS

Gygax, Gary: Dungeon Masters Guide: circa 1979, TSR Games, see entire document.*
Gygax, Gary: Advanced D & D: Player's Handbook: circa 1979, TSR Games, see entire document.*
Advanced Dungeons and Dragons Computer Product: Strategic Simulations, Inc. circa 1988, see entire document.*
Tufte, Edward R.: The Visual Display of Quantitative Information, 1983, Graphics Press, see attached pages.*

English Language Abstract of JP-11-267361.
English Language Abstract of JP-2000-279637.
English Language Abstract of JP-2001-157780.
U.S. Appl. No. 09/499,683.
U.S. Appl. No. 09/964,793.
U.S. Appl. No. 09/817,338.

* cited by examiner

| CHARACTERISTIC (SPEED) | COEFFICIENT K1 |
|---|---|
| 0 | 64 |
| 1 | 56 |
| 2 | 52 |
| 3 | 48 |
| 4 | 40 |
| 5 | 32 |
| 10 | 28 |
| 15 | 24 |
| 20 | 20 |
| 30 | 16 |
| 40 | 12 |
| 60 | 8 |
| 99 | 2 |

FIG. 3B

| ACTION PERFORMED | COEFFICIENT K2 |
|---|---|
| NORMAL ACTION | 3 |
| USE ITEM | 2 |
| SPECIAL ACTION | 5 |
| (ENEMY CHARACTER) | 3 |

FIG. 3C

| STATUS | COEFFICIENT K3 |
|---|---|
| NORMAL | 1 |
| HASTE | 1/2 |
| SLOW | 2 |

TURN BASED VIDEO GAME THAT DISPLAYS CHARACTER BATTLE SEQUENCE

CROSS REFERENCE TO RELATED APPLICATION

The present disclosure relates to subject matter contained in Japanese Patent Application No. 2001-097738, filed on Mar. 29, 2001, the disclosure of which is expressly incorporated herein by reference in its entirety.

BACKGROUND OF THE INVENTION

1. Field of the Invention

The present invention relates to video games. More particularly, the present invention relates to a video game for controlling battles between a player character and an enemy character on a screen, and a video game for controlling battles between an enemy character and multiple player characters operated by multiple individual players playing the game over a network.

2. Description of Related Art

Role playing games are one genre of video game played using a computer. In a typical role playing game the player takes the role of a particular character in the game and experiences simulated adventures through the character that the player controls (referred to below as the "player character") as the story unfolds. In many such games the player character and opposing character (referred to below as the "enemy character") are placed in set zones created in a virtual space. As the player character advances into a zone, the player character fights with an enemy character trying to thwart the player character's attempts to achieve the goal of the story. The story advances when the player character defeats the enemy character.

The player character is typically controlled using buttons on a keypad or joystick. The player character moves and performs specific actions in response to keypad operations. Numerous battle scenes and other events are distributed throughout the story. The game advances as a result of selected operations performed at each event.

Battle scenes in most prior art video games are one-to-one battles between the player character and an enemy character, but video games in which multiple player characters battle multiple enemy characters have also been proposed as a way to make the game more interesting. In video games in which multiple player characters battle multiple enemy characters in a single display screen, however, the action (command) performed by each player character must first be set and the character actions are performed all at once after all player actions have been set.

A drawback to such conventional video games is that even though multiple player characters are present, the number of players has simply increased and once the player instructs the game to execute the selected player actions, the game takes over and there is no way for the player (user) to intervene. In addition, the sequence of play following each character performing a command on the screen, that is, which character has the next turn, is not clear, game action does not proceed smoothly, and the game, thus, loses interest.

There is therefore a need for a video game in which it is easy to determine the sequence of play following each character performing a command on the screen. There is a further need for a video game in which multiple characters can be flexibly and strategically controlled to take advantage of the specific features of each character.

Video game machines having a communications function for connecting to a game server over a network have also recently become available. When a user connects to a game server using such a network-compatible video game machine and accesses a game playing service from the game server, an unknown number of players can simultaneously participate in the same game over the network with the characters controlled by the other players displayed in addition to the user's own player character on the display of the user's video game machine.

The drawback to such video games played by multiple players over a network is again that the sequence of play following each character performing a command on the screen, that is, which character has the next turn, is not clear, game action does not proceed smoothly, and the game, thus, loses interest.

There is, therefore, a need for a video game in which it is easy to determine the sequence of play following each character performing a command on the screen. There is a further need for a video game in which multiple characters can be flexibly and strategically controlled to take advantage of the specific features of each character.

SUMMARY OF THE INVENTION

With consideration for the above needs, an object of the present invention is to provide a video game machine, a video game processing method, a video game program, and a computer-readable data storage medium recording a video game program whereby the sequence of play following each character performing a command on the screen can be easily determined, multiple characters can be flexibly and strategically controlled to take advantage of each character's features, and the video game is therefore very interesting.

To achieve the above object, a first aspect of the present invention includes a computer-readable data storage medium recording a video game program for controlling a battle between player characters and enemy characters on a screen. The program causes the computer to calculate data determining an action sequence for each character based on specific information about the character when the battle is begun, the specific information stored with a correlation to each of the characters. The computer also compares the data calculated for each character, and determines an action sequence for the characters according to a result of the comparison.

The action sequence is thus determined with a degree of regularity based on the specific information. It is therefore possible to provide a storage medium enabling the player to anticipate how the game will develop, making game play more varied and the game more interesting.

In this first aspect of the invention the specific information preferably includes information preset according to an action the player character is to perform. This enables the player to affect the action sequence determination, making game progress more complex and thus making the game even more interesting.

Yet further preferably, the specific information includes information preset according to a characteristic applied to each of the characters in a current display screen, or information preset according to a status of each of the characters, the status derived from video game progress. It is therefore possible to provide a storage medium making game progress even more complex and thus making the game even more interesting.

Yet further preferably, a program for displaying the determined action sequence of the characters on screen is also recorded. It is therefore possible to provide a storage medium enabling the player to quickly and easily determine how the game will progress.

Yet further preferably, the action sequence from the character in the current action to the character acting after a specific turn therefrom is displayed in a specific window on a display screen when the action sequence is reported. It is therefore possible to provide a storage medium enabling efficient use of limited screen space to report the action sequence.

Yet further preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. It is therefore possible to provide a storage medium enabling even more efficient use of limited screen space to report the action sequence.

A second aspect of this invention includes a video game program for controlling a battle between player characters and enemy characters on screen. The program causes a computer to calculate data determining an action sequence for each character based on specific information about the character when the battle is begun, the specific information stored with a correlation to each of the characters. The computer also compares the data calculated for each character, and determines an action sequence for the characters according to a result of the comparison.

The action sequence is thus determined with a degree of regularity based on the specific information. The player can therefore anticipate how the game will develop, making game play more varied and the game more interesting.

In this second aspect of the invention the specific information preferably includes information preset according to an action the player character is to perform. This enables the player to affect the action sequence determination, making game progress more complex and thus making the game even more interesting.

Yet further preferably, the specific information includes information preset according to a characteristic applied to each of the characters in a current display screen, or information preset according to a status of each of the characters, the status derived from video game progress. As a result, game progress is even more complex and the game can be made even more interesting.

Yet further preferably, the determined action sequence of the characters on screen is reported on screen to the player. The player can thus quickly and easily determine how the game will progress.

Yet further preferably, the action sequence from the character in the current action to the character acting after a specific turn therefrom is displayed in a specific window on screen when the action sequence is reported. Limited screen space can therefore be efficiently used to report the action sequence.

Yet further preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. Limited screen space can therefore be used even more efficiently to report the action sequence.

A third aspect of the invention includes a video game processing method for controlling a battle between player characters and enemy characters on screen. The video game processing method includes calculating data determining an action sequence for each character based on specific information about the character when a battle is begun, the specific information stored with a correlation to each of the characters. The method also includes comparing the data calculated for each character, and determining an action sequence for the characters according to a result of the comparison.

The action sequence is thus determined with a degree of regularity based on the specific information in this third aspect of the invention. The player can therefore anticipate how the game will develop, making game play more varied and the game more interesting.

In this third aspect of the invention the specific information preferably includes information preset according to an action the player character is to perform. This enables the player to affect the action sequence determination, making game progress more complex and thus making the game even more interesting.

Yet further, preferably, the specific information includes information preset according to a characteristic applied to each of the characters in a current display screen, or information preset according to a status of each of the characters, the status derived from video game progress. As a result, game progress is even more complex and the game can be made even more interesting.

Yet further, preferably, the determined action sequence of the characters on screen is reported on screen to the player. The player can thus quickly and easily determine how the game will progress.

Yet further, preferably, the action sequence from the character in the current action to the character acting after a specific turn therefrom is displayed in a specific window on screen when the action sequence is reported. Limited screen space can therefore be efficiently used to report the action sequence.

Yet further, preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. Limited screen space can therefore be used even more efficiently to report the action sequence.

A fourth aspect of the invention includes a video game machine having a storage that stores a video game program controlling a battle between player characters and enemy characters on screen; a computer for running a program read from the storage; and a display device disposed as an output for the computer. The computer runs the program to calculate data determining an action sequence for each character based on specific information about the character when the battle is begun, the specific information stored with a correlation to each of the characters. The computer also runs the program to compare the data calculated for each character, and determine an action sequence for the characters according to the result of the comparison.

The action sequence is thus determined with a degree of regularity based on the specific information in this fourth aspect of the invention. The player can therefore anticipate how the game will develop, making game play more varied and the game more interesting.

In this fourth aspect of the invention the specific information preferably includes information preset according to an action the player character is to perform. This enables the player to affect the action sequence determination, making game progress more complex and thus making the game even more interesting.

Yet further preferably, the specific information includes information preset according to a characteristic applied to each of the characters in a current display screen, or information preset according to a status of each of the characters, the status derived from video game progress. As a result, game progress is even more complex and the game can be made even more interesting.

Yet further, preferably, the determined action sequence of the characters on screen is reported on screen to the player. The player can thus quickly and easily determine how the game will progress.

Yet further, preferably, the action sequence from the character in the current action to the character acting after a specific turn therefrom is displayed in a specific window on screen when the action sequence is reported. Limited screen space can therefore be efficiently used to report the action sequence.

Yet further, preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. Limited screen space can therefore be used even more efficiently to report the action sequence.

A fifth aspect of the invention includes a computer-readable data storage medium recording a video game program enabling multiple players to participate over a network and controlling a battle between player characters each controlled by a player and enemy characters. The program causes the computer to calculate data determining an action sequence for each character based on specific information about the character when a battle is begun, the specific information stored with a correlation to each of the characters. The program also causes the computer to compare the data calculated for each character; and determine an action sequence for the characters according to a result of the comparison.

It is therefore possible with this fifth aspect of the invention to provide a storage medium enabling each of the players to anticipate how the game will develop because the action sequence is determined with a degree of regularity based on the specific information, making game play more varied and the game more interesting.

In this fifth aspect of the invention the specific information preferably includes information preset according to the action each of the player characters is to perform. It is therefore possible to provide a storage medium enabling each of the players to affect the action sequence determination, making game progress more complex and thus making the game even more interesting.

Yet further, preferably, the specific information includes information preset according to a characteristic applied to each of the characters in a current display screen, or information preset according to a status of each of the characters, the status derived from video game progress. It is therefore possible to provide a storage medium making game progress even more complex and thus making the game even more interesting.

Yet further, preferably, a program for reporting the determined action sequence of the characters on screen to the players is also recorded. It is therefore possible to provide a storage medium enabling each of the players to quickly and easily determine how the game will progress.

Yet further, preferably, the action sequence from the character in the current action to the character acting after a specific turn therefrom is displayed in a specific window on a display screen when the action sequence is reported. It is therefore possible to provide a storage medium enabling efficient use of limited screen space to report the action sequence.

Yet further, preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. It is therefore possible to provide a storage medium enabling even more efficient use of limited screen space to report the action sequence.

A sixth aspect of this invention includes a video game program enabling a group of players to participate over a network and controlling a battle between player characters each controlled by a player and enemy characters. The program causes the computer to calculate data determining an action sequence for each character based on specific information about the character when a battle is begun, the specific information stored with a correlation to each of the characters. The program also causes the computer to compare the data calculated for each character; and determine an action sequence for the characters according to the result of the comparison.

It is therefore possible with this sixth aspect of the invention to enable each of the players to anticipate how the game will develop because the action sequence is determined with a degree of regularity based on the specific information, making game play more varied and the game more interesting.

In this sixth aspect of the invention the specific information preferably includes information preset according to the action each of the player characters is to perform. It is therefore possible to enable each of the players to affect the action sequence determination, making game progress more complex and thus making the game even more interesting.

Yet further, preferably, the specific information includes information preset according to a characteristic applied to each of the characters in a current display screen, or information preset according to a status of each of the characters, the status derived from video game progress. Game progress can therefore be made even more complex, thus making the game even more interesting.

Yet further, preferably, the determined action sequence of the characters is also reported on screen to the players. Each of the players can therefore quickly and easily determine how the game will progress.

Yet further, preferably, the action sequence from the character in the current action to the character acting after a specific turn therefrom is displayed in a specific window on a display screen when the action sequence is reported. Limited screen space can therefore be efficiently used to report the action sequence.

Yet further, preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. The action sequence can therefore be reported even more efficiently.

A seventh aspect of this invention includes a video game processing method enabling a group of players to participate over a network and controlling a battle between player characters each controlled by a player and enemy characters. The program causes the computer to calculate data determining an action sequence for each character based on specific information about the character when the battle is begun, the specific information stored with a correlation to each of the characters. The program also causes the computer to compare the data calculated for each character; and determine an action sequence for the characters according to a result of the comparison.

It is therefore possible with this seventh aspect of the invention to enable each of the players to anticipate how the game will develop because the action sequence is determined with a degree of regularity based on the specific information, making game play more varied and the game more interesting.

In this seventh aspect of the invention the specific information preferably includes information preset according to the action each of the player characters is to perform. It is therefore possible to enable each of the players to affect the action sequence determination, making game progress more complex and thus making the game even more interesting.

Yet further, preferably, the specific information includes information preset according to a characteristic applied to each of the characters in a current display screen, or information preset according to a status of each of the characters, the status derived from video game progress. Game progress can therefore be made even more complex, thus making the game even more interesting.

Yet further, preferably, the determined action sequence of the characters is also reported on screen to the players. Each of the players can therefore quickly and easily determine how the game will progress.

Yet further, preferably, the action sequence from the character in the current action to the character acting after a specific turn therefrom is displayed in a specific window on a display screen when the action sequence is reported. Limited screen space can therefore be efficiently used to report the action sequence.

Yet further, preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. The action sequence can therefore be reported even more efficiently.

An eighth aspect of this invention is a video game machine having a storage that stores a video game program enabling a group of players to participate over a network and controlling a battle between player characters each controlled by a player and enemy characters; a computer for running a program read from the storage means; and a display device disposed as an output for the computer. The computer runs the program to calculate data determining an action sequence for each character based on specific information about the character when the battle is begun, the specific information stored with a correlation to each of the plural characters. The computer also runs the program to compare the data calculated for each character; and determine an action sequence for the characters according to a result of the comparison.

It is therefore possible with this eighth aspect of the invention to enable each of the players to anticipate how the game will develop because the action sequence is determined with a degree of regularity based on the specific information, making game play more varied and the game more interesting.

In this eighth aspect of the invention the specific information preferably includes information preset according to the action each of the player characters is to perform. It is therefore possible to enable each of the players to affect the action sequence determination, making game progress more complex and thus making the game even more interesting.

Yet further, preferably, the specific information includes information preset according to a characteristic applied to each of the characters in a current display screen, or information preset according to a status of each of the characters, the status derived from video game progress. Game progress can therefore be made even more complex, thus making the game even more interesting.

Yet further, preferably, the computer reports the determined action sequence of the characters on screen to the players. Each of the players can therefore quickly and easily determine how the game will progress.

Yet further, preferably, the action sequence from the character in the current action to the character acting after a specific turn therefrom is displayed in a specific window on a display screen when the action sequence is reported. Limited screen space can therefore be efficiently used to report the action sequence.

Yet further, preferably, when the action sequence is displayed on screen, the action sequence from the character appearing in the action currently displayed to the character acting after the N-th turn therefrom can be changed in response to a player command to display the action sequence of actions after an n-th turn selected by the player to after a specific (n+N) turn therefrom. The action sequence can therefore be reported even more efficiently.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Figure 1:
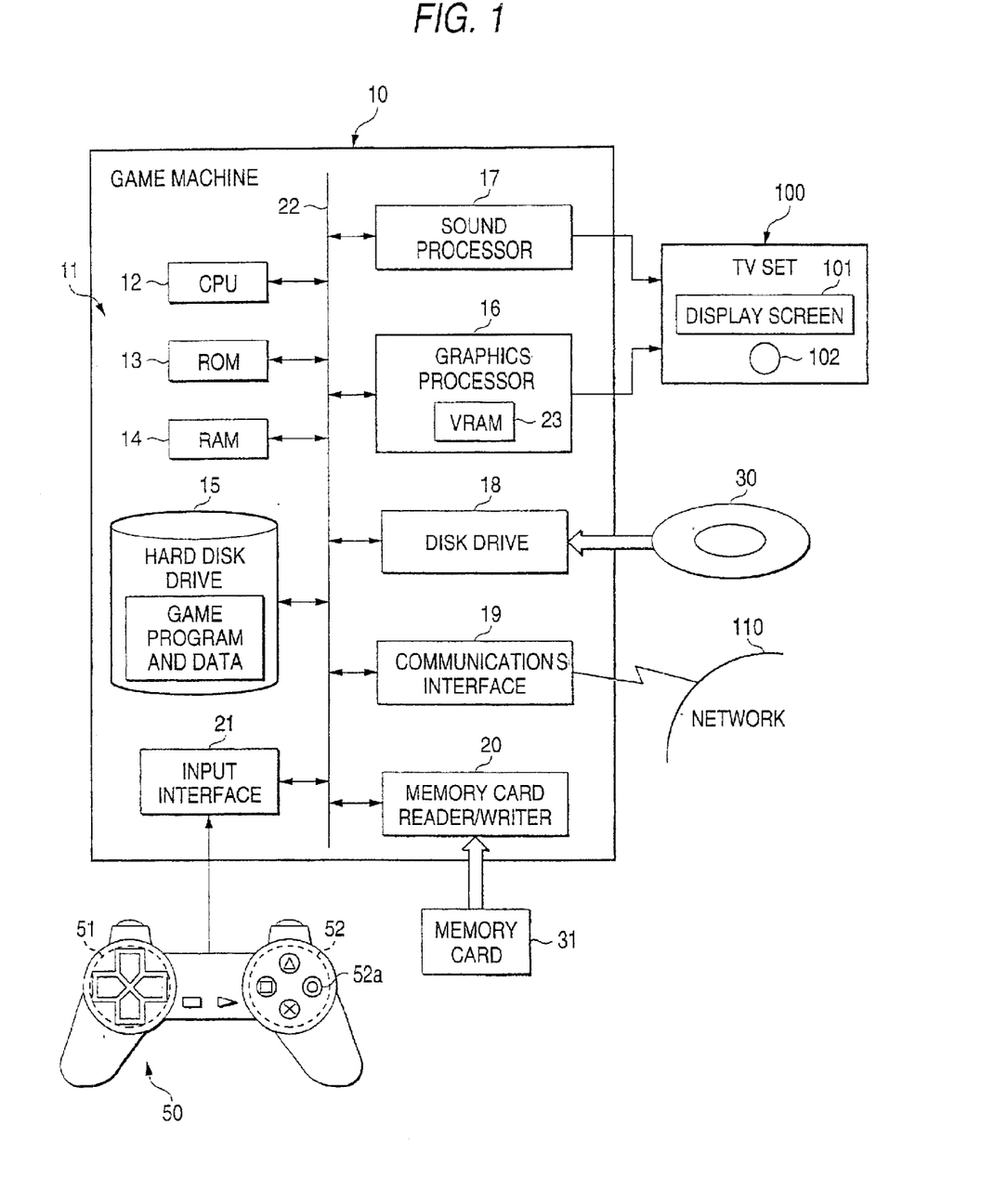
FIG. 1 is a block diagram showing an overall configuration of a video game machine according to a first embodiment of the invention.

A preferred embodiment of the present invention as used in a home video game machine is described below with reference to the accompanying figures. FIG. 1 is a block diagram showing an overall configuration of a video game machine according to this preferred embodiment.

A video game machine in this first embodiment of the invention is described first. Referring to FIG. 1, the video game machine 10 has a game console 11 and a keypad 50 connected to an input jack on the game console 11. A TV set 100 with speakers and a CRT typically is connected to the output jack of the game console 11.

The game console 11 has a CPU 12, ROM 13, RAM 14, hard disk drive 15, graphics processor 16, sound processor 17, disk drive 18, communications interface 19, memory card reader/writer 20, input interface 21, and a bus 22 interconnecting the various components. The game console 11 is connected through the input interface 21 to the keypad 50, which is the game control unit used by the player.

The keypad 50 has a cross-shaped control cursor 51 and a button group 52. The button group 52 includes a confirm button 52a indicated in the figure by a circle. A group of buttons including top and bottom R1 and R2 buttons is also provided on the side of the keypad 50. The keypad 50 further has switches linked to the control cursor 51, R1 button, R2 button, and button group 52. These switches turn on when the corresponding button is pressed. The keypad 50 generates detection signals corresponding to the on/off state of each switch.

The detection signals generated by the keypad 50 are passed to the input interface 21 of the game console 11. When a detection signal from the keypad 50 passes the input interface 21, it becomes detection information indicating whether a particular button on the keypad 50 is on. Control commands input by the user from the keypad 50 are thus supplied to the game console 11.

The CPU 12 centrally controls the video game machine by running an operating system stored to ROM 13, and runs the video game program stored to the program area of RAM 14. The CPU 12 also monitors operation of the keypad 50 through the input interface 21, runs the video game program stored to the program area of the RAM 14 as necessary, and stores data generated as the game progresses to a specific area in RAM 14 as needed. The ROM 13 includes an EEPROM (Electrically Erasable and Programmable Read Only Memory). Specific data in RAM 14 that should be stored even when the power is turned off is stored to the EEPROM before the power is turned off.

RAM 14 has primarily a program area, image data area, and sound data area, and an area for storing other data. Program data, image data, sound data, and other data read from a disk 30 such as a DVD or CD-ROM disk by the disk drive 18 is stored to the respective areas in disk drive 18.

RAM 14 is also used as a work area for storing data produced by the progress of the game. It should be noted that the program data, image data, audio data, and other data read from disk 30 could be stored to hard disk drive with the program data, image data, audio data, and other data stored to the hard disk drive 15 transferred as needed to RAM 14. Data produced by the progress of the game and buffered to RAM 14 could likewise be transferred to and stored on hard disk drive 15.

The graphics processor 16 has a frame buffer in VRAM 23 as buffer memory for storing image data. The graphics processor 16 generates a video signal based on the image data stored to the frame buffer according to control data from the CPU 12 in conjunction with program execution, and outputs the video signal to the TV set 100. The image data stored in the frame buffer is thus presented on the display screen 101 of the TV set 100.

The sound processor 17 functions to generate background music, conversation between the characters, sound effects, and other audio signals. Based on data stored to RAM 14, the sound processor 17 outputs sound signals including voice and audio signals to the speaker 102 of the TV set 100 according to control data from the CPU 12 in conjunction with program execution.

The TV set 100 has a display screen 101 and speaker 102 for presenting video (images) and sound according to the video game content based on the video and sound signals from the game console 11.

The disk drive 18 enables a disk 30 recording medium such as a DVD or CD-ROM disk to be loaded and unloaded as desired, and reads the program data, image data, audio data, and other data of the video game program stored to the disk 30.

The communications interface 19 is connected to a network 110, and communicates as necessary with the servers of the game server group 618 (FIG. 6) and the data storage devices and data processors of other servers to obtain data. It should be noted that the program data, image data, audio data, and other data of the video game program read from disk 30 and stored to RAM 14 can be obtained via the network 110 and communications interface 19.

A memory card 31 can be freely loaded and unloaded from the memory card reader/writer 20, and is used to write relatively small amounts of data that should be saved to the memory card 31. This data includes video game settings and data enabling a game to be resumed when a game is not played to the end.

A data storage medium according to a first embodiment of the invention, that is, disk 30, records a video game program for controlling battles between player characters that can be operated and controlled by the player, and enemy characters that cannot be controlled by the player, and can be read by a computer (CPU 12 and peripheral devices). The computer reads specific data stored for each of multiple player characters according to the read video game program. When a battle starts, the computer calculates data determining the action sequence of each character based on the read specific data, compares the data calculated for each character, and based on the result determines the action sequence between the player characters and enemy characters. The computer also reports the determined action sequence of the multiple characters to the player on screen.

When the computer reports the action sequence to the player, the computer can also display the action sequence from the character in the current action (the current turn) to the character that acts after a specific number of turns from the current turn. The action sequence is displayed in a specific window on the screen. The computer can also change the displayed action sequence from the character in the current turn to the character that acts after a specific turn N from the current turn to the action sequence from a user-selected turn n to the character acting after a specific turn (n+N) thereafter. Note that "turn" as used herein indicates completion of a command process after a command is specified for a particular character.

Therefore, in addition to the functions needed to achieve a conventional video game through a software process run by a CPU 12 based on data stored to various memory units, a game console 11 according to the present invention has a function for reading specific information stored for each of multiple characters and based on this information determining the action sequence between the player characters and enemy character, and a function for reporting the determined action sequences of the multiple characters to the player on screen.

In addition to the function for reporting in a specific window on the screen the determined action sequences of the multiple characters to the player on screen, the game console 11 also has a function for displaying the action sequence from the character in the current turn to the character that acts after a specific next turn, and a function for changing the display of the action sequence from the character in the current turn to the character that acts after a specific turn N to the action sequence from a user-selected turn n to the character acting after a specific turn (n+N).

It is therefore possible to provide a video game whereby the player can easily determine the action sequence following the character currently performing a command (action) on the screen, and multiple characters can be flexibly and strategically controlled to take advantage of each character's features, thus making the video game very interesting. It will also be obvious that these functions can be achieved through application specific hardware rather than as software processes.

Figure 2:
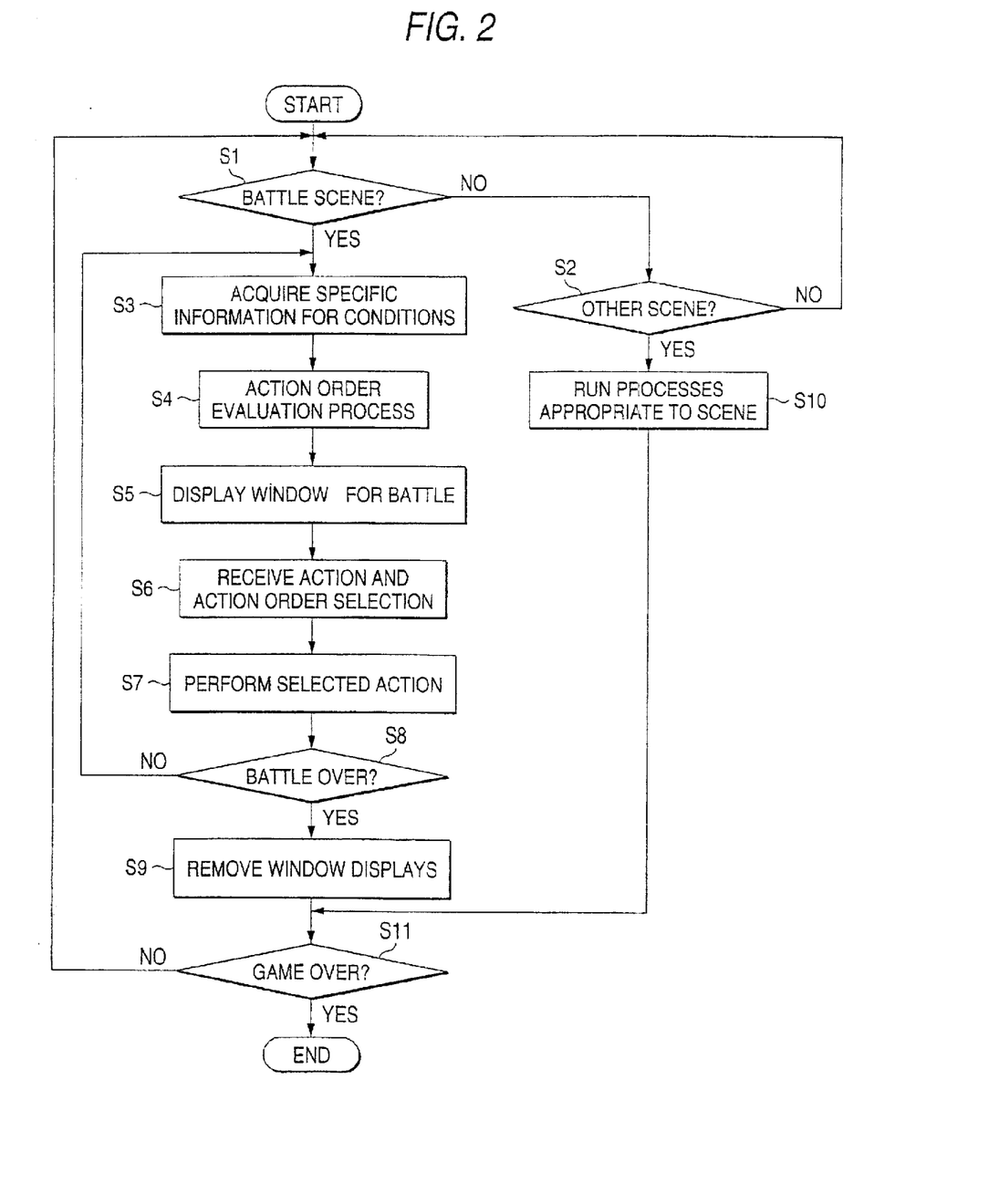
FIG. 2 is a flow chart used to describe an overall operation of a video game machine according to a first embodiment of the invention.

The operation of the first embodiment of the present invention configured as described above is described next. FIG. 2 is a flow chart of an exemplary overall process achieving the operation described above. Reference numerals S1 to S11 in FIG. 2 indicate the steps in this process.

Although not shown in FIG. 2, when the power is turned on a startup program is first read and run to initialize the system and run the processes needed to start the game. More specifically, the program data, image data, audio data, and other data stored to disk 30 (DVD or CD-ROM, for example) is read by the disk drive 18 and stored to RAM 14. The various components are then initialized and set to the read values before actual game play starts, and game play can then commence. The game then advances and a battle scene or other scene is reached at step S1.

Step S1 determines whether the scene is a battle scene. If not, the procedure advances to step S2 to determine if the game has entered another scene (such as travel, dialogue, or shopping). If another scene is not detected, the procedure loops back to S1 and steps S1 and S2 repeat in a standby state.

If a battle scene is detected in step S1, the procedure advances to step S3 and specific information used in the action sequence determination process is obtained. This specific information used in the action sequence determination process includes information previously set according to the action that the player character is to perform, information previously set according to the individual characteristics of the multiple characters in the currently displayed scene, and information previously set according to the status of each of the multiple characters. The status is derived from the progress of the game.

Once the specific information used in the action sequence determination process is obtained, the action sequence determination process is run in step S4. More specifically, a calculation is processed using the obtained specific information, the action sequence of the multiple characters in the current scene is determined based on the result of this calculation, and the resulting determination is stored to RAM 14. When the action sequence determination process in step S4 is completed, the procedure advances to step S5 and a window is displayed for the battle.

The actions and action sequence determination can then be received in step S6. When the actions (commands) to be performed by the player characters are determined by the player selecting the desired actions, the action sequence of the multiple characters is decided. When the action sequence of the multiple characters is decided, the procedure advances to step S7 and the actions (commands) selected by the player are performed. When the actions are completed, decision diamond S8 determines if the battle is over. If step S8 determines the battle is not over because, for example, all enemy characters could not be defeated in the current attack, the procedure loops back to step S3 and steps S3 to S8 repeat.

If all enemy characters were successfully defeated in the current attack and step S8 therefore determines that the battle is over, the procedure advances to step S9, the battle window is closed, and the procedure advances to step S11.

If a non-battle scene was detected in step S2, the procedure advances to step S10, the process for that scene is run, and the procedure then advances to step S11.

Whether the game is over is determined in step S11. If the game is not over, the procedure loops back to step S1 and steps S1 to S11 repeat. If the game is determined to have ended in step S11, any processes related to ending the game are run and the game then ends.

Figure 3A:
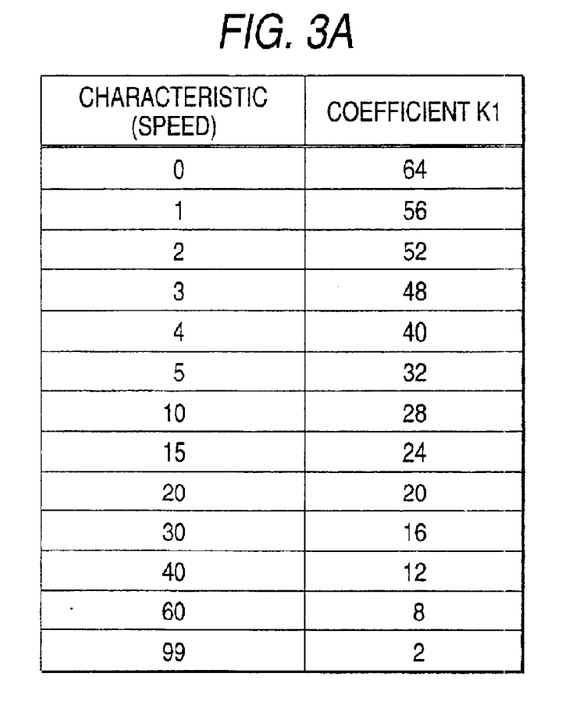
FIGS. 3A, 3B and 3C are also used to describe the operation of a video game machine according to a first embodiment of the invention.
Figure 3B:
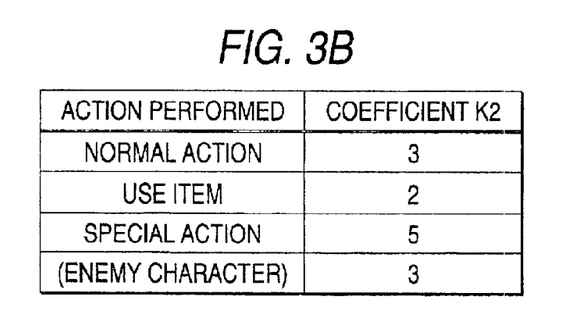
Figure 3C:
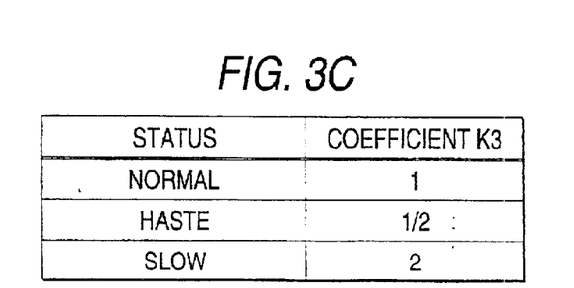

Obtaining the specific information for the action sequence determination process, and the action sequence determination process run based on the obtained specific information, are described in further detail below with reference to a specific game example. FIGS. 3A, 3B, and 3C show the concept of this specific information, which is stored to RAM 14 as conversion tables during the initialization process.

FIG. 3A shows information preset according to the characteristics given to the individual multiple characters. In this case a coefficient K1 corresponding to the value of the character's speed is used in the action sequence determination process. This speed value determines how quickly the character moves and acts and is used in other processes, and the coefficients K1 corresponding to the speed setting are preset to fixed values or set automatically by the game machine according to game progress, and cannot be changed by the player.

FIG. 3B shows information preset according to the action (command) performed by a player character. The coefficient K2 corresponding to the three major types of actions, that is, normal actions, using an item, and special actions, are used in the action sequence determination process. Normal actions include "fight" and "magic," and "use an item" includes the item. Special actions include individual skills and deadly skills. These three types of actions are commands that the player can select for the player character to perform. The coefficient K2 changes according to the selected action, and the player's selection is thus reflected in the value of the coefficient K2. The coefficient K2 for the enemy character is set to a fixed value of 3.

FIG. 3C shows information preset according to the time-related status of the character as the game progresses. Coefficient K3 corresponding to the three status levels: normal, haste, and slow is used in the action sequence determination process. Note that the status changes as the game progresses.

These three coefficients K1, K2, and K3 are used in a calculation process determining an evaluation value, which is then used to determine the action sequence. This calculation could be a simple multiplication operation obtaining the evaluation value as (K1×K2×K3). For example, if the character status is "normal", speed is 15, and the character "fights", the resulting evaluation value is (24×3×1=72). If the status is haste, speed is 60, and the character uses an item, the evaluation value is (8×2×½=8). Evaluation values are thus calculated for each of multiple characters in the current scene, and the values are compared. The character having the lowest evaluation value is the first in the action sequence and the character with the highest evaluation value is last in the action sequence.

The action sequence is determined for each command that the player character can perform. For example, action sequence A is determined for a player character performing a normal action, action sequence B for when the player character uses an item, and action sequence C for when the player character performs a special action. The resulting action sequences are stored temporarily to RAM 14.

Figure 4:
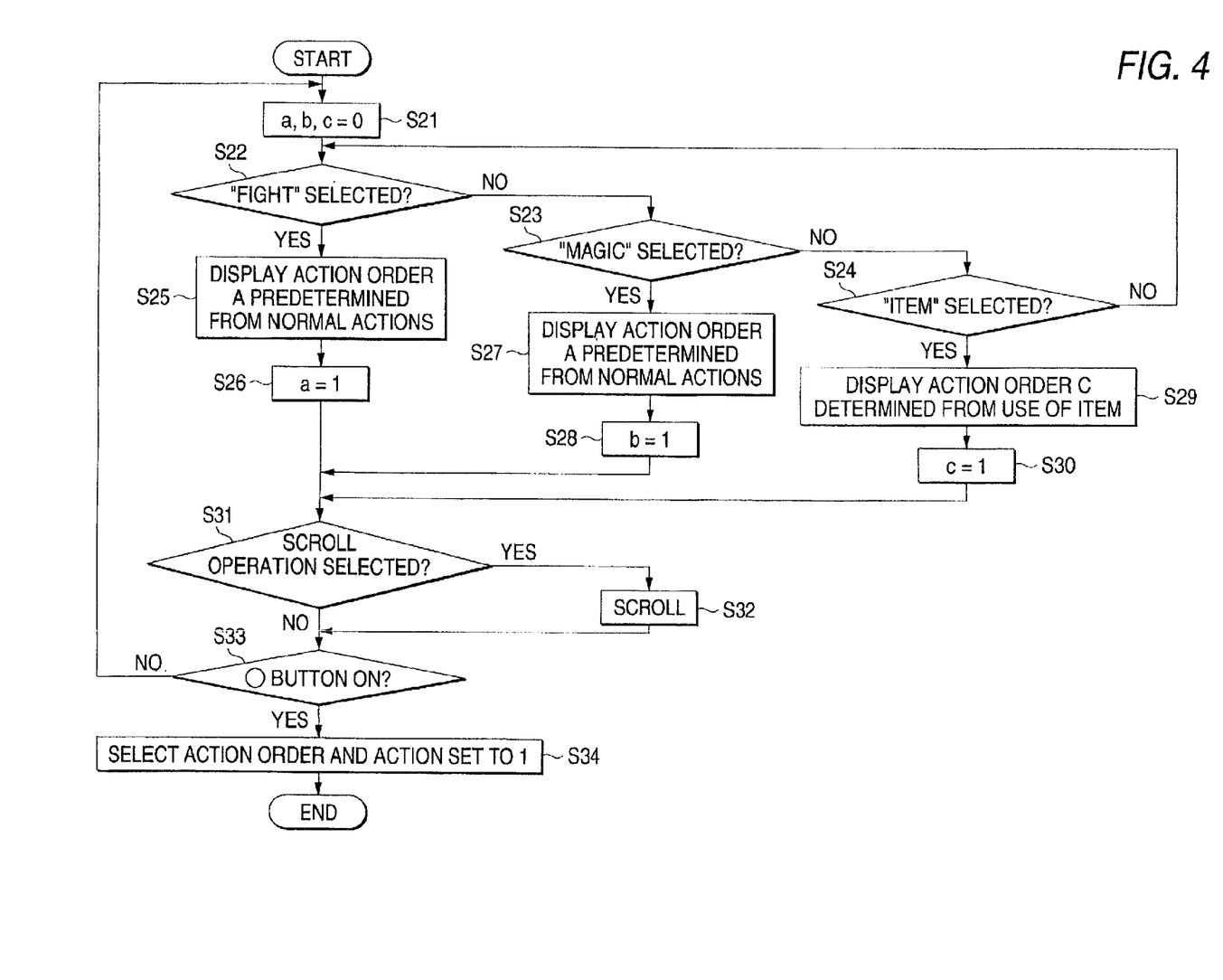
FIG. 4 is a flow chart of an action detection and action sequence determination process in a video game machine according to a first embodiment of the invention.

FIG. 4 is a flow chart showing an exemplary process run in step S6 in FIG. 2 for receiving actions and determining the action sequence in this preferred embodiment of the invention. The steps in the flow chart in FIG. 4 are identified as steps S21 to S34.

Figure 5A:
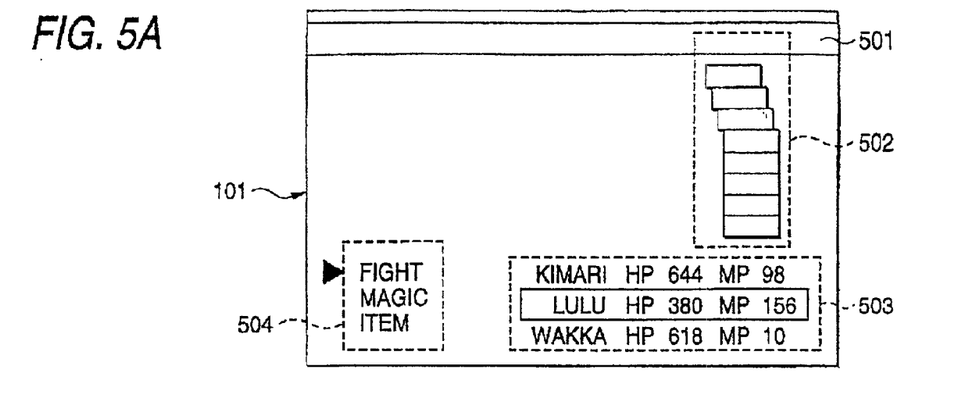
FIGS. 5A, 5B, and 5C are exemplary screen shots used to describe the action detection and action sequence determination process in a video game machine according to a first embodiment of the invention.
Figure 5B:
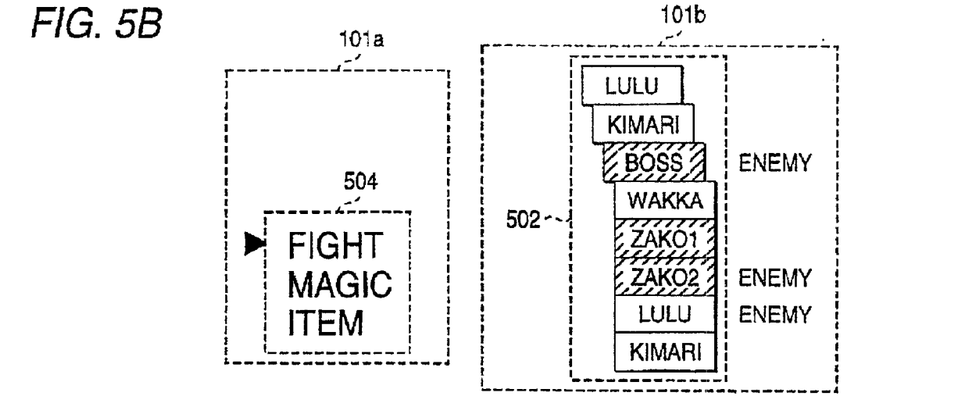
Figure 5C:
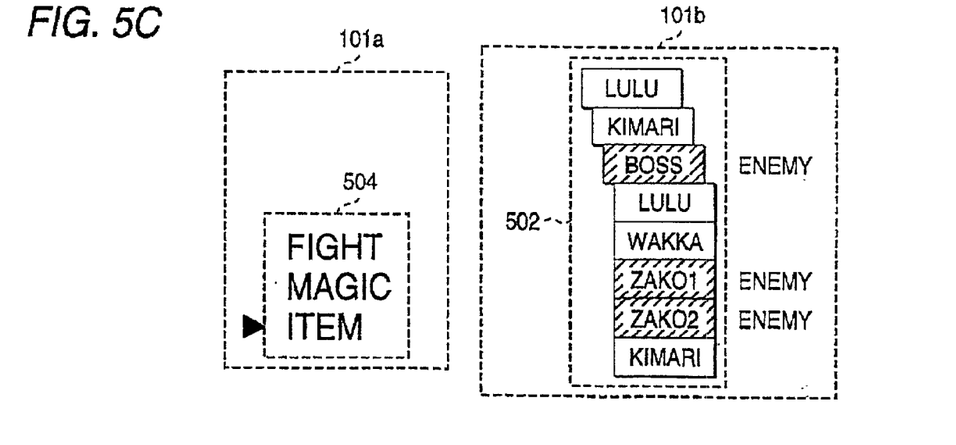

FIGS. 5A, 5B, and 5C show specific examples of display screens in the process for detecting actions and determining the action sequence. Player character actions that can be chosen by the player in the following example include "fight", "magic", and "use item", fight and magic being included in normal actions, and items being included in use item.

Note that as described above, battle scene windows are displayed as shown in FIG. 5A before starting the process for detecting actions and determining the action sequence. More specifically, a message window 501 is used to display messages for the player, and the action sequence is shown in an action sequence window 502. Also shown in FIG. 5A are a window 503 for displaying character data, and a window 504 for displaying a command menu.

When the action detection and action sequence determination process starts, flags a, b, c are cleared (a, b, c=0) in step S21, and the procedure advances to step S22. At step S22 it is determined whether "fight" was selected by the player. If fight was not selected by the player, the procedure advances to step S23 and it is determined whether the player selected "magic." If magic was not selected by the player, the procedure advances to step S24 and it is determined whether the player selected "use item." If use item was not selected by the player, the procedure loops back to step S22 and steps S22 to S24 repeat in a standby mode.

Let us assume that the player operates the control cursor 51 to move the cursor and select an action for the player character to perform, and that it is determined in step S22 that the player selected "fight." In this case the procedure advances to step S25 and as shown in FIG. 5B action sequence A determined from selection of a "normal action" is read from RAM 14. Note, further, that screen area 101*a* including the action sequence window 502 and area 101*b* including the command menu window 504 are shown enlarged in FIG. 5B, and because "fight" was selected the character names Lulu, Kimari, Boss, Wakka, Zako-1, Zako-2, Lulu, and Kimari are displayed in sequence from the top in the action sequence window 502.

In this case the character currently performing an action is Lulu as indicated at the top of the list, and the action sequence to the eight turn, that is, the seventh turn from Lulu, is shown. Lulu, Kimari, and Wakka are the three characters that can be controlled by the player, and Boss, Zako-1, and Zako-2 (shown in the shaded blocks) are enemy characters that cannot be controlled by the player. Once the action sequence A is displayed, flag a is set (a=1) in step S26, and the procedure advances to step S31.

If in step S23 it is determined that the player selected "magic," the procedure advances to step S27, and action sequence A determined from selection of a "normal action" is again displayed as shown in FIG. 5B. When action sequence A is displayed, flag b is set (b=1) in step S27, and the procedure advances to step S31.

If in step S24 it is determined that the player selected "item," the procedure advances to step S29 and action sequence C determined from selection of "use item" as shown in FIG. 5C is read from RAM 14. Note that the area 101*a* containing the action sequence window 502 and the area 101*b* containing the command menu window 504 are shown enlarged in FIG. 5C. When "item" is selected, the characters are Lulu, Kimari, Boss, Lulu, Wakka, Zako-1, Zako-2, Kimari as shown in order from the top in FIG. 5C.

It will be noted that in action sequence A Lulu is in the first (current) action position and in the seventh position from the top, but in action sequence C in FIG. 5C Lulu is moved up to the fourth position and the other characters from the fourth to eighth positions in action sequence A each move down one position. When action sequence C is displayed for the actions that the player characters are to perform, flag c is set (c=1) in step S30 and the procedure advances to step S31.

In step S31 it is determined whether the player indicated a scrolling operation. If a scrolling operation is indicated, the procedure advances to step S32 and the action sequence window scrolls. The R1 button and R2 button, for example, can be used for scrolling so that the window scrolls up when the R1 button is pressed and scrolls down when the R2 button is pressed.

More specifically, pressing the R2 button scrolls the display to display a total of eight turns, from the character in the current turn to the seventh turn, to display the action sequence from the character in the n-th turn selected by the player to the character in the (n+7)-th turn. Pressing the R1 button returns to the previous display. When scrolling is completed, the procedure advances to step S33. If scrolling is not indicated in step S31, the procedure also advances to step S33.

Whether the confirm button 52*a* was pressed is then determined in step S33. If the confirm button 52*a* is pressed the procedure advances to step S34, the actions that are set to 1 and the action sequence are set based on flags a, b, and c, a process is run to perform those actions, and the action detection and action sequence determination process ends.

If in step S33 it is determined that the confirm button 52*a* is not pressed, the procedure loops back to step S21, and steps S21 to S33 repeat. Step S34 is run only when confirm button 52*a* is pressed. Then in step S34 the actions that are set to 1 and the action sequence are set based on flags a, b, and c, a process is run to perform those actions, and the action detection and action sequence determination process ends.

The first embodiment of this invention as described above offers the advantages described below.

First, the player can anticipate game development and action, the game can be made more varied, and the game can be made more interesting because the action sequence is determined with a degree of regularity by using information preset according to the characteristics applied individually to multiple characters and information preset according to a character status value derived from the progress of the game.

Second, because the action sequence is determined using information preset according to the actions that the player character is to perform, the player can directly affect how the action sequence is determined, thereby making the progression of game events more complex and making the game even more interesting.

Third, because the action sequence of multiple characters is shown on the screen, the player can quickly and easily see how the game will progress.

Fourth, because the action sequence from the character in the current turn to the character appearing after a specific n-th turn from the current turn is displayed in a specific window on screen, limited screen space can be used effectively and the player can be appropriately informed of the action sequence.

Fifth, the action sequence from the character appearing in the current turn to the character appearing after the N-th turn therefrom can be scrolled by the player to display the action sequence from the character appearing after an n-th turn selected by the player to the character appearing after the N-th turn therefrom, that is, after turn (n+N). As a result, the player can be even more efficiently informed of the action sequence, and the player can be appropriately supplied with the information needed by the player.

It should be noted that the above first preferred embodiment of this invention has been described using control cursor 51 and confirm button 52a on the keypad 50 to select the player character actions and the action sequence, but it will be obvious that other buttons or controls can be alternatively used. In addition, only the timing of the confirm button 52a is monitored above to confirm the actions and action sequence and start the game. It will also be obvious, however, that the player commands can be detected using the timing at which the switch associated with another specific button turns off, or both the on and off timing of a switch linked to a specific button could be monitored, or a combination of these could be used. Further alternatively, a combination of the on or off times of a switch linked to a specific button could be used.

As also described above the action sequence is determined in this first embodiment of the invention using information preset according to the characteristics applied individually to multiple characters, information preset according to the status derived from the progress of the game, and information preset according to the actions that the player characters are to perform, the result is presented to the player in a window and determined according to the player's instructions. It will be obvious, however, that the game could be advanced through an internal process only without reporting the determined action sequence to the player.

Yet further, while this embodiment has been described as determining the action sequence using three types of information, that is, information preset according to the characteristics applied individually to multiple characters, information preset according to the status derived from the progress of the game, and information preset according to the actions that the player characters are to perform, the action sequence determination process could be run using only one or using any two of these information types. It is also possible to run the action sequence determination process using information from other processes or in combination with information from other processes.

Figure 6:
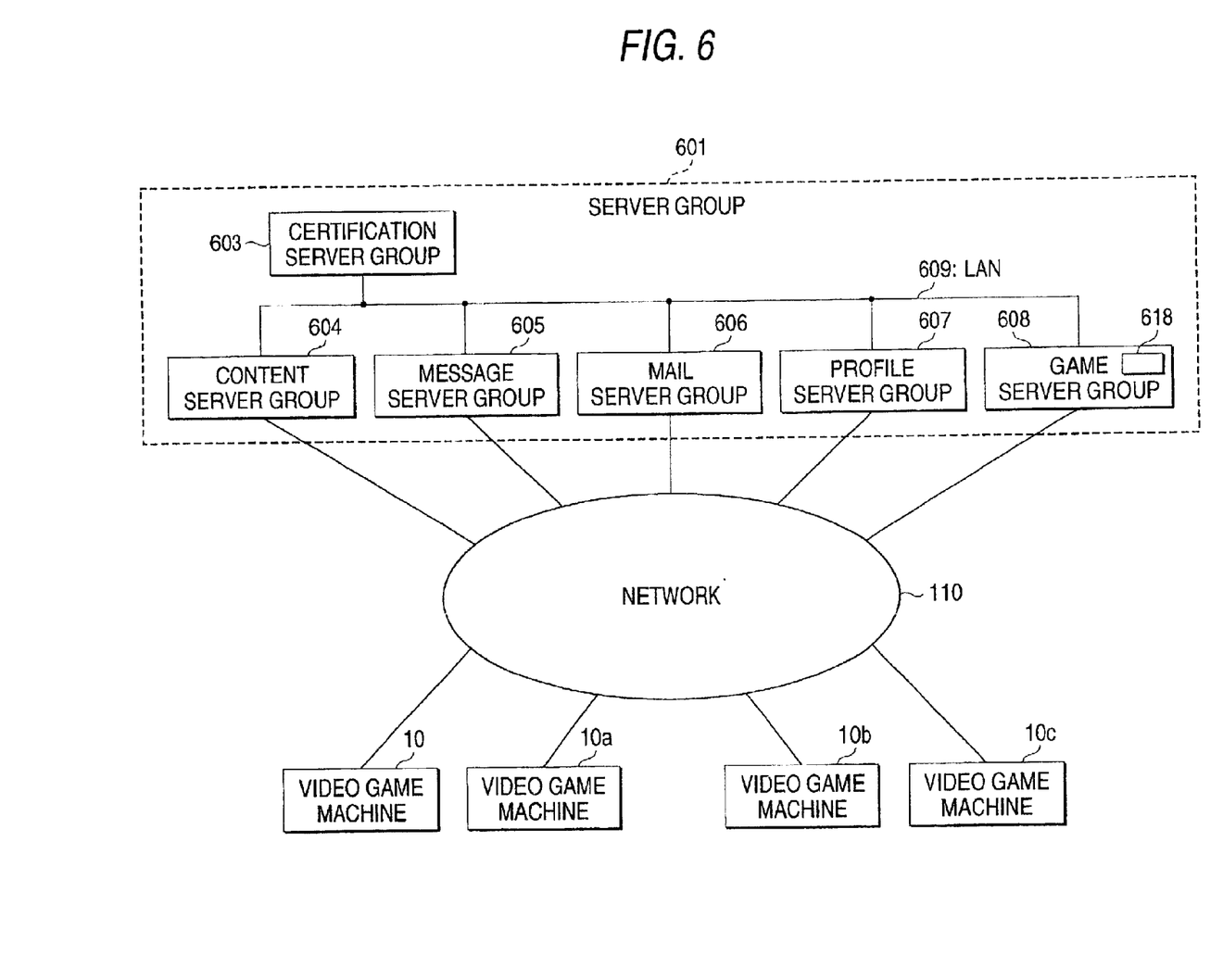
FIG. 6 shows an overall configuration of a video game system according to a second embodiment of the invention.

A second embodiment of the present invention applied to a game system consisting of a game server and video game machines is described next below. FIG. 6 shows the overall configuration of a game system according to this second embodiment of the invention.

The configuration of a game system in this second embodiment is described first. As shown in FIG. 6a server group 601 such as an Internet service provider (ISP) and multiple video game machines 10, 10a, 10b, 10c connect via a common network 110. The network 110 could be the Internet, for example. The video game machines 10 are a video game machine as described in the first embodiment above.

The ISP server group 601 includes, for example, a certification server group 603 for account management and user certification; a content server group 604 for providing audio, video, and other content; a message server group 605 for providing a chat and messaging environment; a mail server group 606 for providing an e-mail service; a profile server group 607 for managing user profiles; and a game server group 608 for providing a game playing environment. These different server groups 603 to 608 are interconnected via a LAN 609.

To connect a video game machine to a particular server in the ISP server group 601, the video game machine first accesses the certification server group 603 via the network 110 using an Internet protocol to be certified and receive the menu screen. When the player using a particular video game machine then selects the desired service from the presented menus, the video game machine 10, 10a, 10b, 10c is connected to the server group providing the selected service and can then access and use the desired service.

More specifically, the game server group 608 includes a video game server 618 enabling video games to be played on line. When a player using any one of the video game machines 10, 10a, 10b, 10c asks to start a game, the video game server 618 connects and sends the game screen to the display of each participating video game machine. The game then proceeds with the server parallel processing requests from each connected video game machine. The game screen displayed on each participating video game machine shows the player character controlled by that player together with the player characters controlled by the other participating players.

The video game machines 10, 10a, 10b, 10c included in this game system and the video game server 618 connected to the video game machines over the network are conceptually a single video game processing system. The memory of the individual machines can be shared and used as needed, and game processing can be distributed to the multiple CPUs in various ways according to the program.

A data storage medium according to this second embodiment of the invention records a video game machine for controlling battles between enemy characters and multiple player characters controlled by multiple players playing the game over a network. The data storage medium can be read by a computer (the CPU of each video game machine 10, 10a, 10b, 10c and the CPU of the video game server 618 and peripheral devices). The computer reads specific information stored for each of the multiple characters according to the read video game program. When a battle starts, the computer calculates the data for determining the action sequence for each character based on this specific data and compares the data calculated for each character to determine the action sequence between the enemy characters and player characters based on the result of this comparison. The computer can also send the resulting action sequence of the multiple characters to the display of each of the multiple players participating in the game.

In addition, when the computer reports the action sequence of each of multiple characters to the players, it can also display the action sequence from the character appearing in the current turn (action) to the character appearing after a specific turn therefrom, and can scroll the displayed action sequence from the character appearing in the current turn (action) to the character appearing after the N-th turn therefrom to display the action sequence from the character appearing after an n-th turn selected by one of the multiple players to the character appearing after the N-th turn therefrom, that is, after turn (n+N).

Therefore, in addition to the functions of the first embodiment achieved by a software process based on data stored to memory, a computer consisting of the CPU of each of the video game machines 10, 10a, 10b, 10c, the CPU of the video game server 618, and the peripheral circuits has a function for obtaining specific information used in the action sequence determination process as necessary according to a specific communications protocol, and a function for reporting the action sequence determined for the multiple characters to the multiple players participating in the game by means of a specific communications protocol. In other words, this second embodiment differs from the first embodiment in that a specific communications protocol is used to obtain the specific information, and a specific communications protocol is used to report the action sequence to the multiple players. It will also be obvious that these functions can be achieved through application specific hardware rather than as software processes.

It is therefore possible even when multiple players are playing a video game over a network for the players to easily determine which character plays next after the character currently playing on screen. It is also possible to provide an extremely interesting video game in which multiple characters can be flexibly and strategically controlled according to the characteristics of the individual characters.

Figure 7:
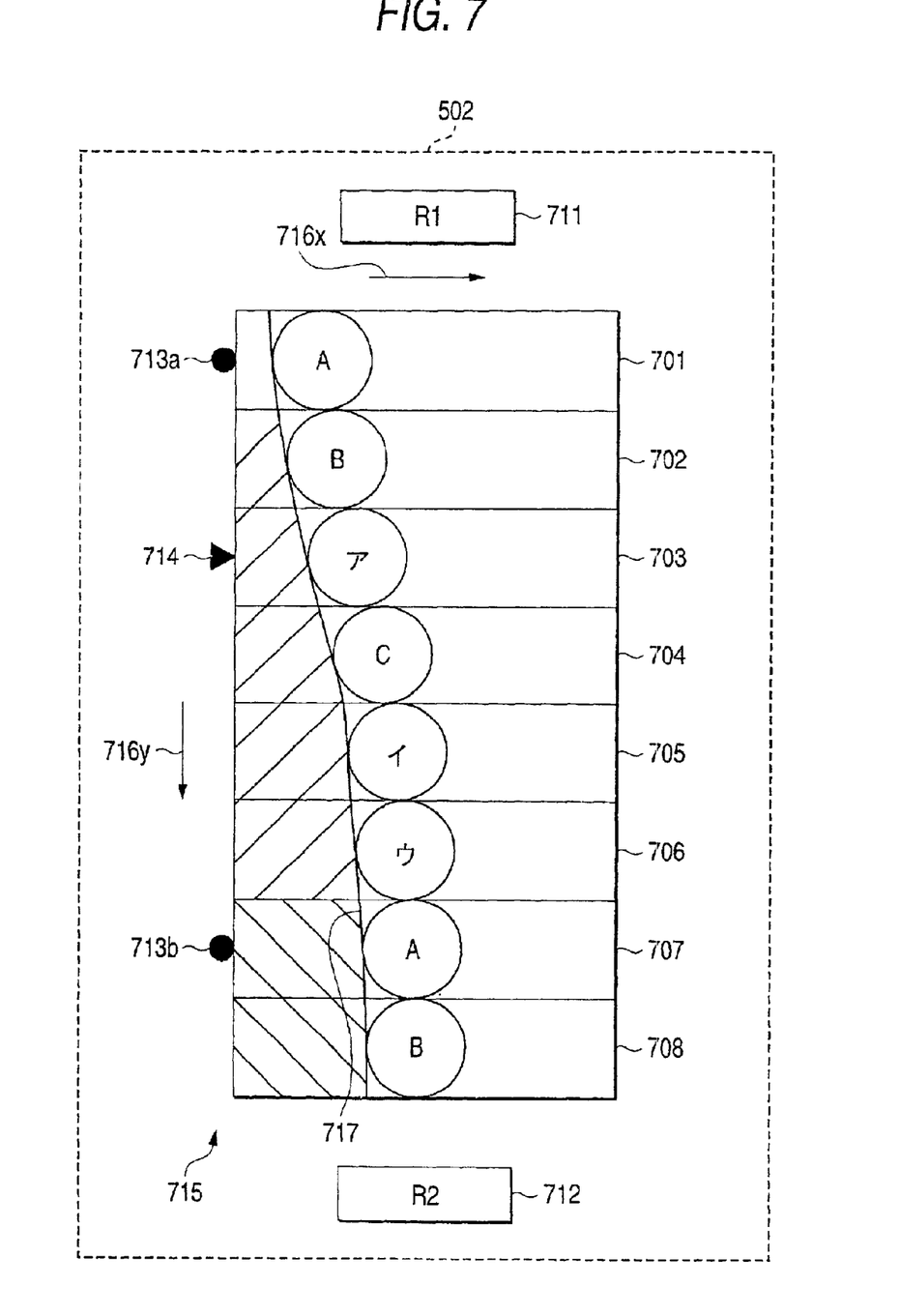
FIG. 7 describes how the action sequence is presented in the first and second embodiments of the invention.

Displaying the action sequence in the above first and second embodiments is further described below. FIG. 7 describes the action sequence display, the area indicated by dotted line 502 being a window for displaying the action sequence.

As shown in FIG. 7, frames 701 to 708 are displayed in the action sequence window 502. An icon for each character of character name A, B, C, D, E, F is displayed in each frame 701 to 708. In other words, the characters are displayed in sequence from the character acting in the current turn to the character appearing seven turns later (that is, a total of eight turns) with the action sequence of each character in the sequence indicated by arrow 716y. More specifically, character A shown in frame 701 at the top is playing in the current turn, character B is scheduled to appear next, and so forth through to character B in frame 708.

The icons are also presented in the direction indicated by arrow 716x correlated to time. That is, the icons form a time chart referenced to the current time at edge 715. The progress of the game can thus be determined by the relative positions of the icons in the direction indicated by arrow 716x.

In addition, the area from line 717 contacting an icon other than the character A in the current turn to end 715 is painted a specific color with the color becoming darker in each area in the direction indicated by arrow 716y. In FIG. 7 frames 701 to 706 are in the same area and are therefore painted the same color density (pale), while frames 707 and 708 are in the next area and are darker. It is also possible to visually confirm that the time until a particular character's turn comes increases as the slope of line 717 to arrow 716y increases.

The name of a button R1 functioning as an upward scroll button is also displayed in a display area 711 above the top frame 701, and the name of a button R2 functioning as a downward scroll button is displayed in a display area 712 below the bottom frame 708. The player can therefore refer to these visual cues to scroll the display as desired.

The character with the opportunity to play next after the current character is indicated by markers 713a and 713b shown to the outside of edge 715 at the corresponding frame 701 to 708. The character with the next opportunity to attack the enemy character being attacked by the current character (the enemy character selected for attack by the current character) is indicated by marker 714. The players can therefore easily determine the order of play, including which enemy characters will play, and can therefore strategically determine character actions.

As will be known from the preceding embodiments of the invention, the sequence of characters next after the character in the current turn can be easily determined, and multiple characters can be flexibly and strategically controlled while taking advantage of the characteristics given to each character, whether a player character and enemy characters are battling on screen or whether multiple players participating over a network and controlling multiple characters are battling multiple enemy characters.

Although the present invention has been described in connection with the preferred embodiments thereof with reference to the accompanying drawings, it will be obvious that various changes and modifications will be apparent to those skilled in the art. Such changes and modifications are to be understood as included within the scope of the present invention as defined by the appended claims. In addition, like parts are referenced by like reference numerals in the figures.

What is claimed is:

1. A video game processing method for controlling a battle between at least one player character and at least one enemy character on a screen, the video game processing method comprising:
    calculating data determining an action sequence for each character based on specific information about the character when the battle is begun, the specific information stored with a correlation to each of the characters;
    comparing the data calculated for each character;
    determining an action sequence for the characters according to a result of the comparison; and
    displaying the action sequence, from the character in the current action to the character acting a number of turns after the current character, in a specific window on the screen.

2. The video game processing method as described in claim 1, wherein the specific information includes information preset according to an action the player character is to perform.

3. The video game processing method as described in claim 1, wherein the specific information includes information preset according to a characteristic applied to each of the characters in a current display screen.

4. The video game processing method as described in claims 1, wherein the specific information includes information preset according to a status of each of the characters, the status derived from video game progress.

5. The video game processing method as described in claim 1, wherein, displaying the action sequence further comprises scrolling, the action sequence from the character appearing in the action currently displayed to the character acting a predetermined number of turns after the currently displayed action in response to a player command to display the action sequence of actions after a turn selected by a player to the predetermined number of turns after the selected turn.

6. A video game processing apparatus comprising:
a storage that stores a video game program controlling a battle between at least one player character and at least one enemy character on a screen;
a computer for running a program read from the storage; and
a display device disposed as an output for the computer; and
characterized by the computer running the program and executing:
calculating data determining an action sequence for each character based on specific information about the character when the battle is begun, the specific information stored with a correlation to each of the characters;
comparing the data calculated for each character;
determining an action sequence for the characters according to a result of the comparison; and
displaying the action sequence, from the character in the current action to the character acting a number of turns after the current character, in a specific window on the display device.

7. The video game processing apparatus as described in claim 6, wherein the specific information includes information preset according to an action the player character is to perform.

8. The video game processing apparatus as described in claim 6, wherein the specific information includes information preset according to a characteristic applied to each of the characters in a current display screen.

9. The video game processing apparatus as described in claim 6, wherein the specific information includes information preset according to a status of each of the characters, the status derived from video game progress.

10. The video game processing apparatus as described in claim 6, wherein, when the action sequence is displayed, the action sequence from the character appearing in the action currently displayed to the character acting a predetermined number of turns after the currently displayed action can be scrolled in response to a player command to display the action sequence of actions after a turn selected by a player to the predetermined number of turns after the selected turn.

11. A computer-readable data storage medium recording a video game program enabling a plurality of players to participate over a network and controlling a battle between a plurality of player characters each controlled by a player and at least one enemy character, the program causing the computer to execute:
calculating data determining an action sequence for each character based on specific information about the character when the battle is begun, the specific information stored with a correlation to each of the characters;
comparing the data calculated for each character;
determining an action sequence for the characters according to a result of the comparison; and
displaying the action sequence, from the character in the current action to the character acting a number of turns after the current character, in a specific window on a screen.

12. The computer-readable data storage medium as described in claim 11, wherein the specific information includes information preset according to an action each of the player characters is to perform.

13. The computer-readable data storage medium as described in claim 11, wherein the specific information includes information preset according to a characteristic applied to each of the characters in a current display screen.

14. The computer-readable data storage medium as described in claim 11, wherein the specific information includes information preset according to a status of each of the characters, the status derived from video game progress.

15. The computer-readable data storage medium as described in claim 11, further recording a program for reporting on a screen to each of the players the determined action sequence of the characters.

16. The computer-readable data storage medium as described in claim 11,
wherein, when the action sequence is displayed on the screen, the action sequence from the character appearing in the action currently displayed to the character acting a predetermined number of turns after the currently displayed action can be scrolled in response to commands from the players to display the action sequence of actions after a turn selected by a player to the predetermined number of turns after the selected turn.

17. A video game processing method enabling a plurality of players to participate over a network and controlling a battle between a plurality of player characters each controlled by a player and at least one enemy character, a program stored on a medium causing a computer, on the network, having a display screen to execute the method comprising:
calculating data determining an action sequence for each character based on specific information about the character when the battle is begun, the specific information stored with a correlation to each of the characters;
comparing the data calculated for each character;
determining an action sequence for the characters according to a result of the comparison; and
displaying the action sequence, from the character in the current action to the character acting a number of turns after the current character, in a specific window on the screen.

18. The video game processing method as described in claim 17, wherein the specific information includes information preset according to an action each of the player characters is to perform.

19. The video game processing method as described in claim 17, wherein the specific information includes information preset according to a characteristic applied to each of the characters in a current display screen.

20. The video game processing method as described in claim 17, wherein the specific information includes information preset according to a status of each of the characters, the status derived from video game progress.

21. The video game processing method as described in claim 17, wherein, the displaying further comprises scrolling, the action sequence from the character appearing in the action currently displayed to the character acting a predetermined number of turns after the currently displayed action in response to commands from the players to display the action sequence of actions after a turn selected by a player to the predetermined number of turns after the selected turn.

22. A video game processing apparatus comprising:
a storage that stores a video game program enabling a plurality of players to participate over a network and controlling a battle between the plurality of player characters each controlled by a player and at least one enemy character;
a computer for running a program read from the storage; and
a display device disposed as an output for the computer; and
characterized by the computer running the program and executing:
  calculating data determining an action sequence for each character based on specific information about the character when the battle is begun, the specific information stored with a correlation to each of the characters;
  comparing the data calculated for each character;
  determining an action sequence for the characters according to a result of the comparison; and
  displaying the action sequence, from the character in the current action to the character acting a number of turns after the current character, in a specific window on the display screen.

23. The video game processing apparatus as described in claim 22, wherein the specific information includes information preset according to an action each of the player characters is to perform.

24. The video game processing apparatus as described in claim 22, wherein the specific information includes information preset according to a characteristic applied to each of the characters in a current display screen.

25. The video game processing apparatus as described in claim 22, wherein the specific information includes information preset according to a status of each of the characters, the status derived from video game progress.

26. The video game processing apparatus as described in claim 22, wherein, when the action sequence is displayed on screen, the action sequence from the character appearing in the action currently displayed to the character acting a predetermined number of turns after the currently displayed action can be scrolled in response to commands from the players to display the action sequence of actions after a turn selected by a player to the predetermined number of turns after the selected turn.

27. The video game processing method as described in claim 1, wherein when the action sequence is displayed on the screen the player characters and enemy characters are placed along the axis indicating the sequence of action, and the positions of the placed player characters and enemy characters are adjusted along a time axis,
  the time axis intersecting the action sequence axis and indicating the timing of each action.

28. The video game processing apparatus as described in claim 6, wherein when the action sequence is displayed on the screen the player characters and enemy characters are placed along the axis indicating the sequence of action, and the positions of the placed player characters and enemy characters are adjusted along a time axis,
  the time axis intersecting the action sequence axis and indicating the timing of each action.

29. The computer-readable data storage medium as described in claim 11, wherein when the action sequence is displayed on the screen the player characters and enemy characters are placed along the axis indicating the sequence of action, and the positions of the placed player characters and enemy characters are adjusted along a time axis,
  the time axis intersecting the action sequence axis and indicating the timing of each action.

30. The video game processing method as described in claim 17, wherein when the action sequence is displayed on the screen the player characters and enemy characters are placed along the axis indicating the sequence of action, and the positions of the placed player characters and enemy characters are adjusted along a time axis,
  the time axis intersecting the action sequence axis and indicating the timing of each action.

31. The apparatus as described in claim 22, wherein when the action sequence is displayed on the screen the player characters and enemy characters are placed along the axis indicating the sequence of action, and the positions of the placed player characters and enemy characters are adjusted along a time axis,
  the time axis intersecting the action sequence axis and indicating the timing of each action.

* * * * *